(12) United States Patent
Gatta et al.

(10) Patent No.: US 9,919,468 B1
(45) Date of Patent: Mar. 20, 2018

(54) TIRE RUBBER EXTRUDER AUTOMATIC LOADING AND MANAGEMENT SYSTEM

(71) Applicant: R.P. Gatta, Inc., Aurora, OH (US)

(72) Inventors: Raymond P. Gatta, Aurora, OH (US); Wes Graham, Aurora, OH (US); Matthew L. Myers, Aurora, OH (US)

(73) Assignee: R.P. GATTA, INC

( * ) Notice: Subject to any disclaimer, the term of this patent is extended or adjusted under 35 U.S.C. 154(b) by 136 days.

(21) Appl. No.: 14/512,363

(22) Filed: Oct. 10, 2014

(51) Int. Cl.
| | | |
|---|---|---|
| *B29C 47/10* | (2006.01) |
| *B25J 15/00* | (2006.01) |
| *B25J 11/00* | (2006.01) |
| *B65H 20/02* | (2006.01) |
| *B65H 21/00* | (2006.01) |
| *B29L 30/00* | (2006.01) |

(52) U.S. Cl.
CPC ......... *B29C 47/1036* (2013.01); *B25J 11/005* (2013.01); *B25J 15/0028* (2013.01); *B65H 20/02* (2013.01); *B65H 21/00* (2013.01); *B29L 2030/00* (2013.01)

(58) Field of Classification Search
CPC . B25J 11/005; B25J 15/0028; B29C 47/1036; B29C 66/855; B29L 2030/00; B65H 20/02
USPC .............................................. 425/37
See application file for complete search history.

(56) References Cited

U.S. PATENT DOCUMENTS 6,220,319 B1 * 4/2001 Reuter .................. B29D 30/52
  152/152.1

* cited by examiner

*Primary Examiner* — George Koch
(74) *Attorney, Agent, or Firm* — John D Gugliotta

(57) ABSTRACT

A tire rubber extruder automatic loading and management system is provided for continuous and automatic control of a rubber extrusion line. Batches of rubber slab material, whether for sidewall or tread, are connected in an automated manner to provide a continuous material stream for feeding a tread extruder supply conveyor within a tire manufacturing system. Joiner between adjacent slabs are implemented utilizing a stitched joint of material. Stitch pins are driven through both rubber slab layers to a specific depth into a clearance hole to create an optimized rubber mechanical adhesion zone. The result is a funnel shaped adhesion channel penetrating entirely through the layers of material perpendicular to the direction slab movement and tension. The resulting "rivet" like button structures are extremely strong, have no Impurities that could otherwise be added via adhesives, and can be formed in an automated manner within the available process cycle times.

8 Claims, 29 Drawing Sheets

TIRE RUBBER EXTRUDER AUTOMATIC LOADING AND MANAGEMENT SYSTEM

RELATED APPLICATIONS

There are no previously filed, nor currently any co-pending applications, anywhere in the world.

BACKGROUND OF THE INVENTION

1. Field of the Invention

The present invention relates generally to tire manufacturing systems and methods and, more particularly, to a system and method for the automated loading of, at least, the tread and sidewall extruder supply conveyor within a tire manufacturing system.

2. Description of the Related Art

The manufacture of rubber vehicle tires is a complex and integrated process that incorporates rubber, fiber, textile and steel cord into an integrated assembly of inner liner, body plies, bead assembly, belts, sidewalls, and tread. Prior to the integration of these various components into the completed tire assembly, a number of productions steps are performed that may include: mixing of the rubber compound; preparation of the fabric cord, steel cord, and bead wire; "calendering" of the innerliner, steel belt and ply cord; extrusion, or shaping, of the tire's sidewall and tread; and the actual building, curing, and inspection of the tires.

In the rubber compound mixing operation, a rubber compound formulation is prepared from two major ingredient including rubber material itself and a filler or extender. These ingredients can be combined in various ways and at differing rations so as to achieve a desired result, such as, for example, optimized performance, maximized traction in both wet and dry conditions, or improved rolling resistance. These can be variously achieved through selection of one or more types of rubber, along with the type and amount of filler to blend with the rubber. In general, there are four major rubbers used: natural rubber, styrene-butadiene rubber (SBR), polybutadiene rubber (BR), and butyl rubber (along with halogenated butyl rubber). The first three are primarily used as tread and sidewall compounds, while butyl rubber and halogenated butyl rubber are primarily used for the innerliner, or the inside portion that holds the compressed air inside the tire. Fillers or extenders may include carbon black and silica, and there are several types of each that can differ for tread, sidewall, and apex applications. Other ingredients also come into play to aid in the processing of the tire or to function as anti-oxidants, anti-ozonants, and anti-aging agents. In addition, the "cure package"—a combination of curatives and accelerators—is used to form the tire and give it its elasticity.

Once the rubber compound mixing is completed, the mixed batch processed to form it into a continuous sheet called a "slap" or "slab". The slab is then transferred to other areas for bead wire assembly preparation, innerliner calendering, steel and/or fabric belt/ply cord calendering, tire sidewall extrusion, and tire tread extrusion.

Of particular importance as it relates to the present invention is the tire tread and sidewall extrusion operations. Currently, tire components such as tread, sidewall, and apex are prepared by forcing uncured rubber compound through an extruder to shape the tire tread or sidewall profiles. Extrusion is one of the most important operations in the tire manufacturing process because it processes most of the rubber compounds produced from the mixing operation and then prepares various components for the ultimate tire building operation.

The extruder in a tire manufacturing process is a screw-type system, consisting primarily of an extruder barrel and extruder head. Though there are many variations that can exist within the extrusion process, the given examples are quite general, and are not limited to the specific examples given. With reference to the use of rubber feedstock extruded into a continuous strip for use in tire tread and tire manufacture, first the rubber compound is fed into the extruder barrel where it goes through a heating, blending, and pressurizing process. Then, the rubber compound flows to the extruder head where it is shaped under pressure. On a continuous extrusion line feedstock material is prepared and conveyed to an extruder machine, with the screw of the extruder machine propelling the feedstock through the machine, compressing it and forcing it out through a die.

Several impediments currently exist in the operation of the extruder process. First and foremost results from the dichotomy that exists between the continuous process nature of the extruder device itself and the batch nature of the mixing processes that occur upstream to feed the extruder. Since rubber is not mixed in a continuous process, separate batches are sequentially prepared into large slabs which then must be palletized and physically transported to the extruder for feeding one after another into the extrusion process. This is currently done by joining the trailing edge of a prior slab to the leading edge of a subsequent slab to form a transition between the batch and continuous processes. Such a joiner can occur through the addition of adhesive or through mechanical cohesive mechanism, or both. Currently, limitations exist in the effectiveness, strength and consistency of such a joint between rubber slabs.

A second impediment that exists concerns the handling of the large slabs and the joining process to connect adjacent slabs. The current state of the art requires that this be a manual process, and as such is subjected to variations in quality, consistency and efficiency that result naturally from changes in work staff. Further, with the slabs being heavy and being fed at a predetermined and continuous pace, such a process is further ripe for improvements that can ease health and safety concerns for the affected work staff.

A third identified area of potential improvement is in the potential reduction of waste associated the joining of adjacent slabs. Since both the leading and trailing edges of each slab are neither of a clean geometric shape nor of a regular consistency, it is difficult to optimize the connection between slabs during the time allotted for such an operation. Unacceptable variation in material at the connection, i.e. "lumps" of material are created. The current solution is to discard material at the leading edge of the next slab edge in a manner that errs on excess. As such this operation can be targeted for reduction of material waste, but only after solution of the prior listed areas of improvement.

It is preferable for purposes of productivity and safety improvement that automation be applied for feeding the extruder supply conveyor within a tire manufacturing system. Further, it is preferable that an improved method and implementation of a mechanically formed rubber joint between adjacent slabs be implemented that can increase the strength, consistency, repeatability and efficiency of such a joint. Consequently, a need has been felt for providing tread extruder auto loading and management system.

SUMMARY OF THE INVENTION

It is therefore objects of the present invention to provide an improved and more productive tire manufacturing system and method.

It is further objects of the present invention to provide a new and improved method and apparatus for continuous and automatic control of a rubber extrusion line.

It is a feature of the present invention to provide a system and method for the automated loading of, at least, the tread extruder supply conveyor within a tire manufacturing system.

It is a further feature of the present invention to provide improved method and implementation of joiner between adjacent slabs of rubber that can increase the strength, consistency, repeatability and efficiency of such a joint.

The present invention provides a system and method for automatically loading and placing rubber slabs for the continuous feeding of continuous lengths of rubber extruder feed stock in the operation of the extruder process during tire manufacturing. Individual batches of slab rubber, whether intended for tread or sidewall fabrication, are received to a system loading station for subsequent preparation. While various material handling solutions may be utilized to present material to the preparation station, in the current state of the art slab rubber, once calendared to the appropriate size and composition, is cooled and accumulated in batches onto distribution pallets for subsequent handing and movement via a towmotor, forklift or equivalent type of industrial truck. The slabs, being of relatively long linear lengths, are accumulated in a fan-fold pile and will thereby form a generally irregular pile of folded material that may result in slight cohesion between adjacent rubber folds. Additionally, irregularly shaped leading and trailing edges exist that must be received.

It should be noted that the present invention provides numerous innovations, one of which includes accommodation of such current state of the art limitations in preparing batch slab rubber for subsequent continuous processing. As such, it should further be noted that the present invention is in no way limited to this current state of the art, and various adaptations that may evolve to accommodate future developments in the art of material handling in such manufacturing systems should be considered a design choice within the range of equivalents of the present invention.

Rubber feedstock is received into the preparation station by receiving entire pallets of material. The material pile is analyzed by a vision system to record the size, contours and shape of the apex of the slab pile. Resulting from the fanfold piling of rubber the upper surface of the feedstock ultimately has a unique shape, with high spots and edges existing that have wide variations between material batches. By scanning the upper surface and the outer edges of the slab, a reliable pick area can thereby be identified as a grasping target for a slab load system. The slab load system is formed including an inverted, six axis robotic manipulator in which a customized end effector is supported. The end effector incorporates two grasping structures: a claw device having bulk grasping capabilities; and edge grippers having fine grasping capabilities. Once a target is identified as a reliable pick area of the material pile, the robot is instructed by a control processor to grasp a calculated and identified target, lift the grasped element as being a working leading edge, and transporting the working leading edge to a prep station assembly. The preps station assembly works the received material at its working leading edge in a variety of ways. The slab material is dragged over a roller an released from its fan-fold configuration in a manner that tries to overcome any randomized cohesive attachment forces that may exist between the material folds. A pair of half width rollers pivot over the slap, and then pinch the slab to drive the slab back and forth to gage its thickness with the robot endeffectdos scanning device, and the working leading edge is then presented to a cutting table assembly in which a second scanner device can identify the shape and contour of the working leading edge to allow for cutting of a new, clean (i.e. straight) leading edge. The working leading edge of the feed material is then presented to a prep station assembly and to a second scanner device to identify the shape and contour of the working leading edge to allow, if required, for cutting of a new, clean (i.e. straight), single thickness leading edge. The working leading edge of the feed material within the prep station assembly and irregular boundaries and thicknesses are identified and a cut line is identified that eliminates such irregular material. Further, since "clumping" of rubber material may result from the grasping of the claw on the end effector, this bound material is further identified for removal in the cut scrap that is formed by the cutting table cutter. However if the rubber slab has a fairly square leading edge, and is of a single thickness, the rubber slab is not cut to minimize scrap.

The newly created leading edge is then secured by the edge grippers so that the newly identified leading edge of the rubber material slab may then be transported to and located onto a feed stitcher assembly. The trailing end of the prior batch of rubber slab material is positioned on the feed stitcher assembly such as to allow a subsequent batch of rubber slab to be positioned linearly adjacent thereto, and slightly overlapping, for subsequent attachment together. By mechanically affixing adjacent linear rubber slabs together in an automated fashion, the continuous process nature of the extruder device itself can be utilized. The present tire rubber extruder auto loading and management system provides a continuous processing transition between the batch nature of the mixing processes that occur upstream and the continuous nature of the material feed for the extruder.

This is currently done by joining the trailing edge of a prior slab to the leading edge of a subsequent slab to form a transition between the batch and continuous processes. Given the current short comings in joiner systems that are currently available, the creation of a mechanical stitching together of adjacent rubber slabs forms a qualitative and quantitative improvement over the existing art. Conventional mechanical cohesive mechanism or adhesive systems exhibit weaknesses in the effectiveness, strength and consistency of the joint between rubber slabs. Further still, the present invention can provide an improved mechanical joiner in an automated manner that can allow the heavy batches of slabs to be affixed together to form a continuous feed of material at a predetermined and continuous pace.

Further objects, advantages, features and results of the Invention will become more fully apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
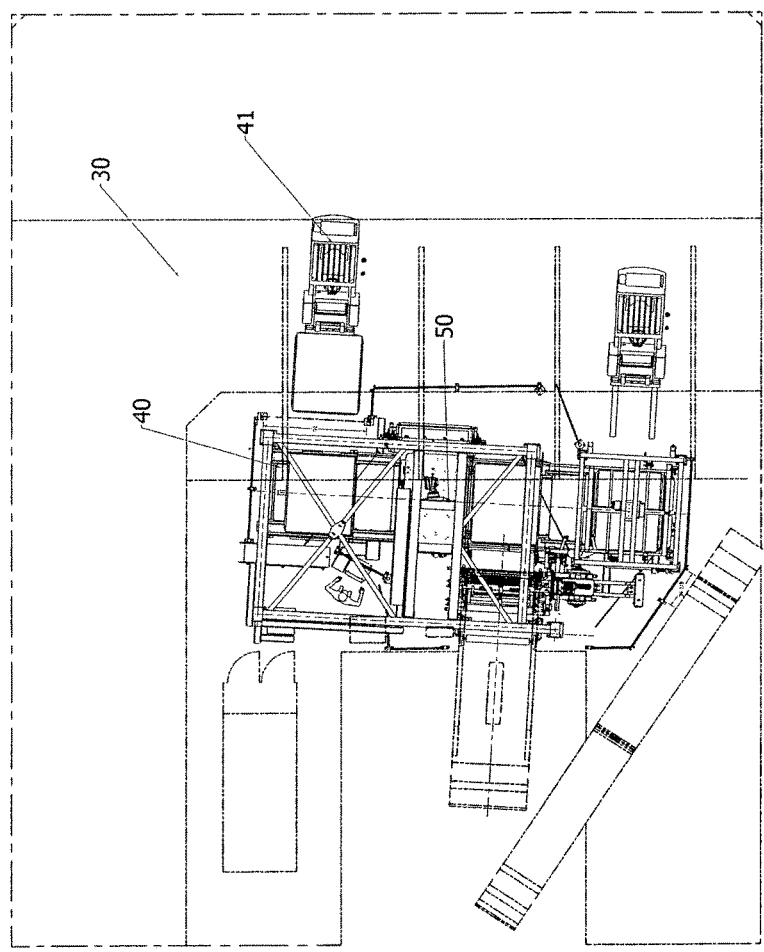
FIG. 1 is a top plan view of a tire rubber extruder automatic loading and management system according to the preferred embodiment of the present invention.
Figure 2:
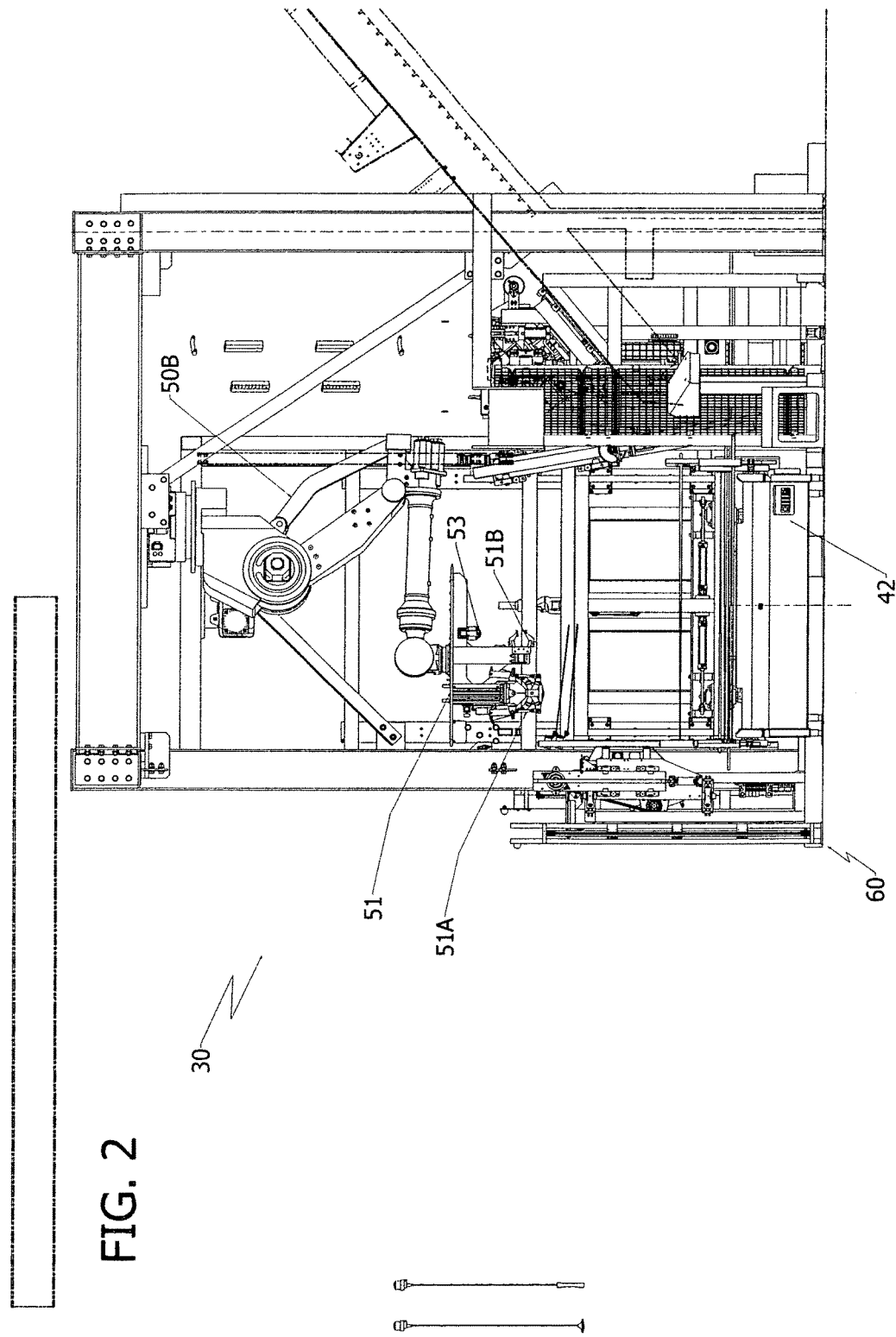
FIG. 2 is a front elevational view thereof.

The best mode for carrying out the invention is presented in terms of its preferred embodiment, herein depicted within the FIGS. 1 through 29.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals indicate the same parts throughout the several views, a tire rubber extruder automatic loading and management system, generally noted as 30, is shown according to the preferred embodiment of the present invention. For purposes of enabling the present description in a manner that may enable the present invention to those skilled in the relevant art, the system 30 incorporates a number of assemblies, including a loading station 40, a slab load system 50, a prep station assembly 60, a stripper roller assembly 75, a feed stitcher assembly 70 and an exit feeding conveyor system 80. Such assembly subdivisions are intended merely to be for ease of description and should not be taken as divisions within the system than are anything other than mere design selection amongst a range of functional equivalents.

As shown the loading station 40 is depicted for the receipt and handling of palletized materials delivered via forklift, towmotor or similar industrial truck or mechanism 41 onto a pallet indexing conveyor 42 capable of positioning a pallet 43 laterally within the system 30 and relative to the slab load system 50. The centerline of pallet indexing conveyor 42 is shown aligned with a slab load system 50 and is formed including an inverted, six axis robotic manipulator 50b in which a customized end effector 51 is supported. As shown, the robotic manipulator 50b is inverted from above the indexing conveyor 42 upon spherical bearing to allow for manipulation of material within the system 30. It has been found that the use of a Fanuc 900iA/350 series robot, or equivalent, having double guided pneumatic cylinders may be a sufficient design selection within the present invention to provide the functionality anticipated within the object, scope, features and advantages of the present invention. The end effector 51 incorporates two grasping structures: a claw device 51a having bulk grasping capabilities; and edge grippers 51b having fine grasping capabilities. A scanner vision system 52 is further provided and positioned on the end effector 51 for scanning the contour of the upper surface, generally noted as 45, for an apex or high spot 46. The apex 46 is thereby identified as a grasping target for a slab load system 50.

Figure 3:
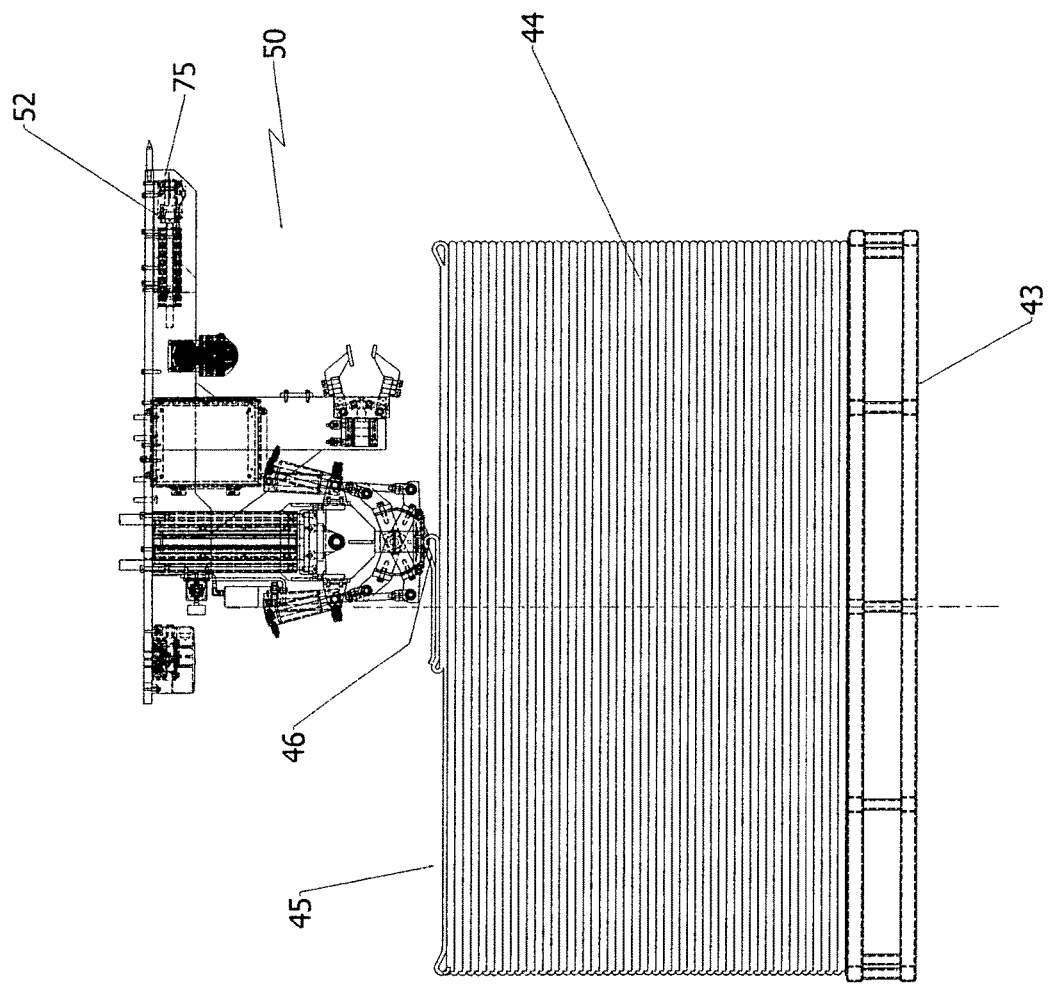
FIG. 3 is a front elevational view of slab loading system for use therewith.
Figure 4:
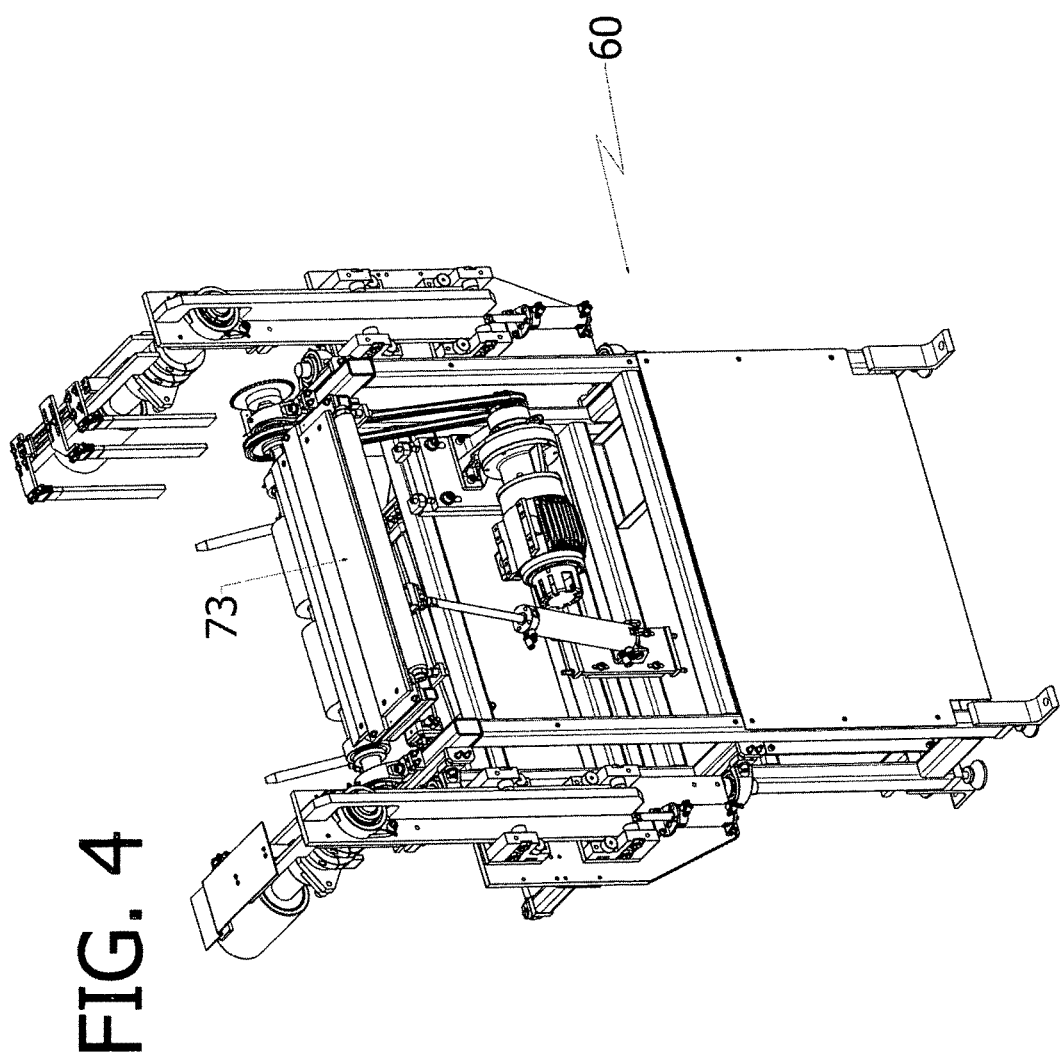
FIG. 4 is a rear perspective view of a prep station assembly for use with a tire rubber extruder automatic loading and management system according to the preferred embodiment of the present invention.
Figure 5:
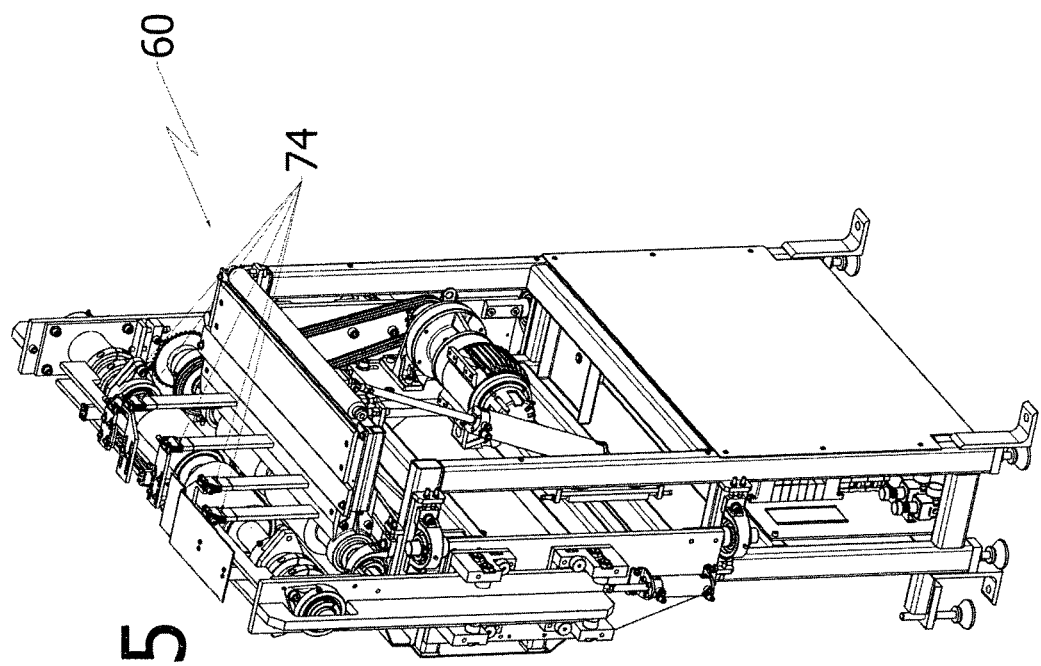
FIG. 5 is a side perspective view of the prep station assembly of FIG. 4.
Figure 6:
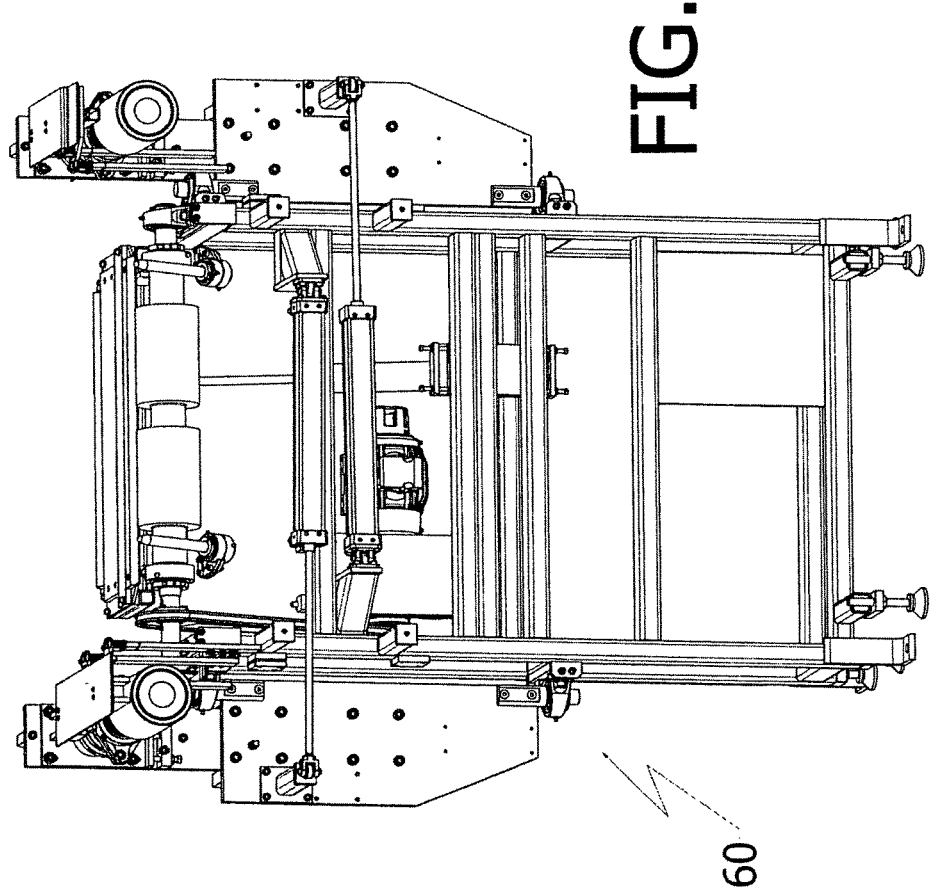
FIG. 6 is a front elevational view of the prep station assembly of FIGS. 4-5.
Figure 7:
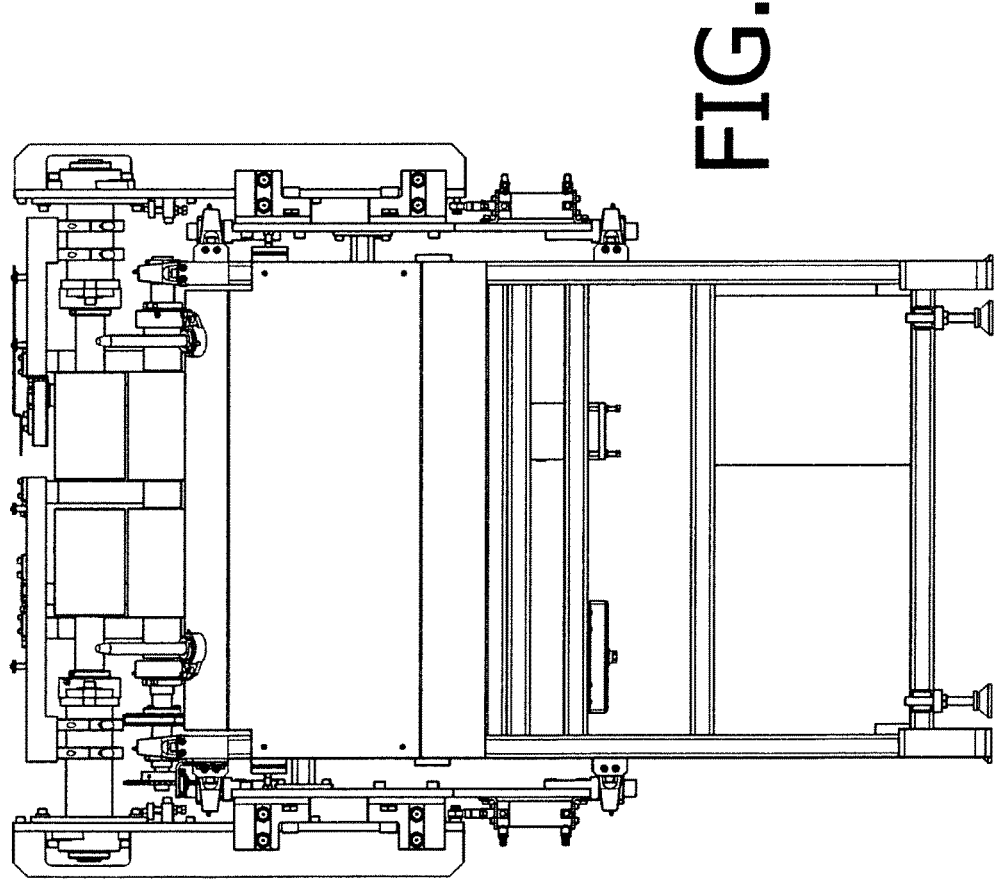
FIG. 7 is a rear elevational view of the prep station assembly of FIG. 6.
Figure 8:
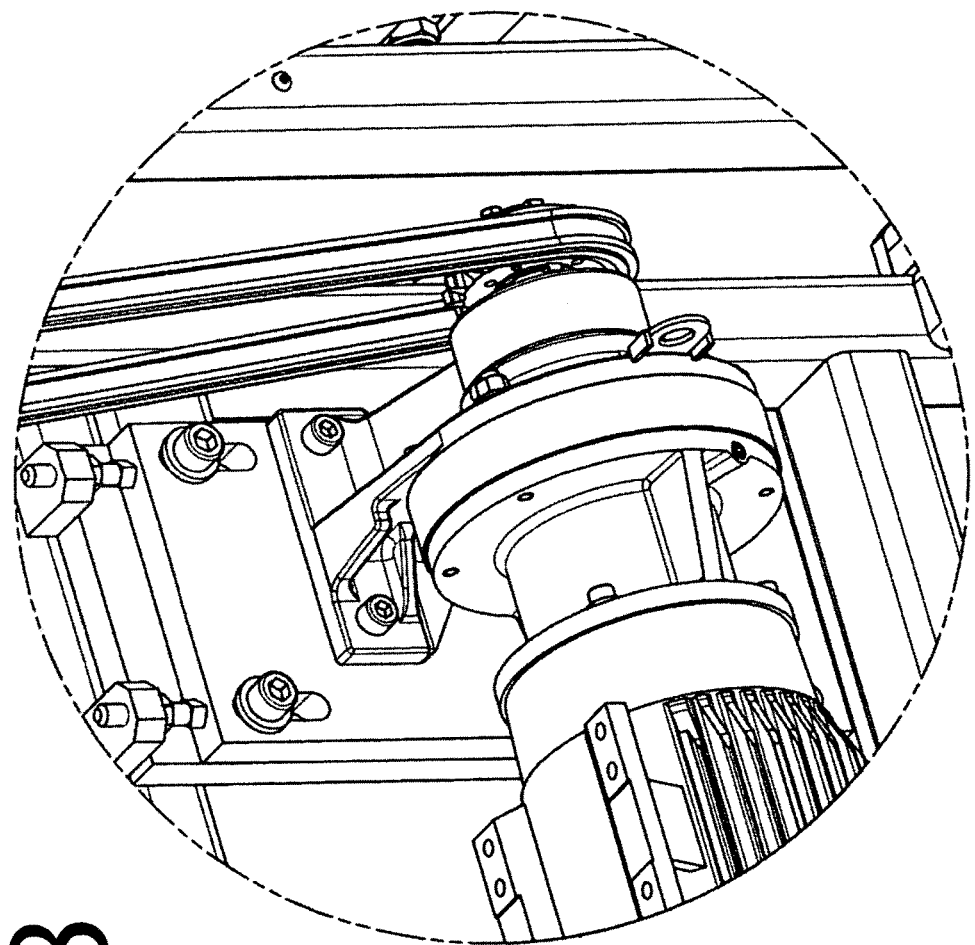
FIG. 8 is a partial detail perspective view taken along detail VIII of FIG. 4.
Figure 9:
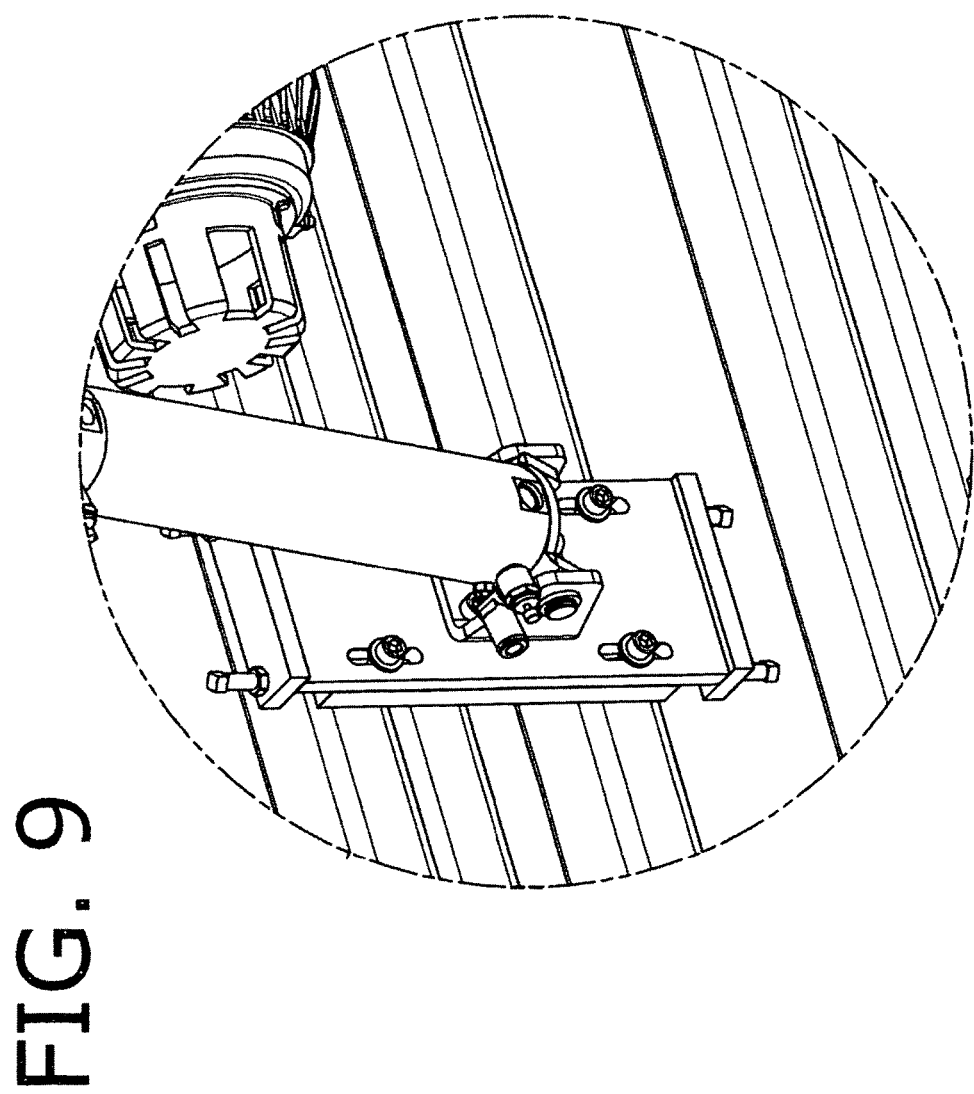
FIG. 9 is a partial detail perspective view taken along detail IX of FIG. 4.
Figure 10:
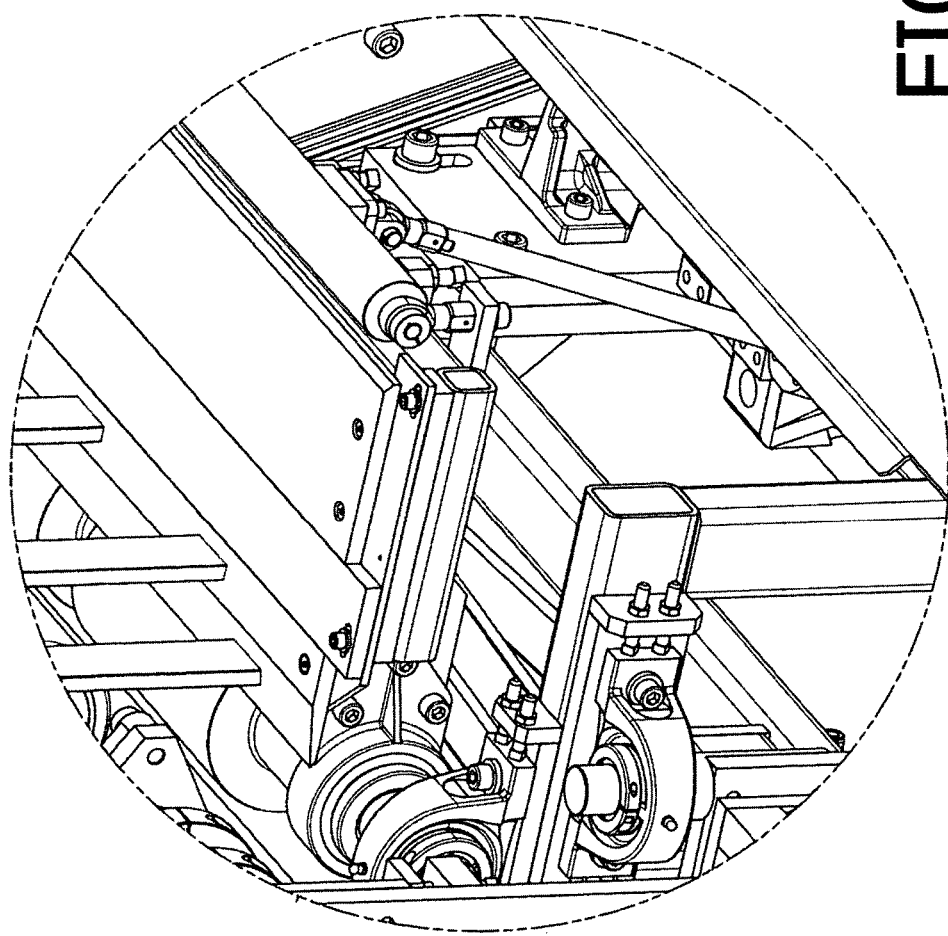
FIG. 10 is a partial detail perspective view taken along detail X of FIG. 5.
Figure 11:
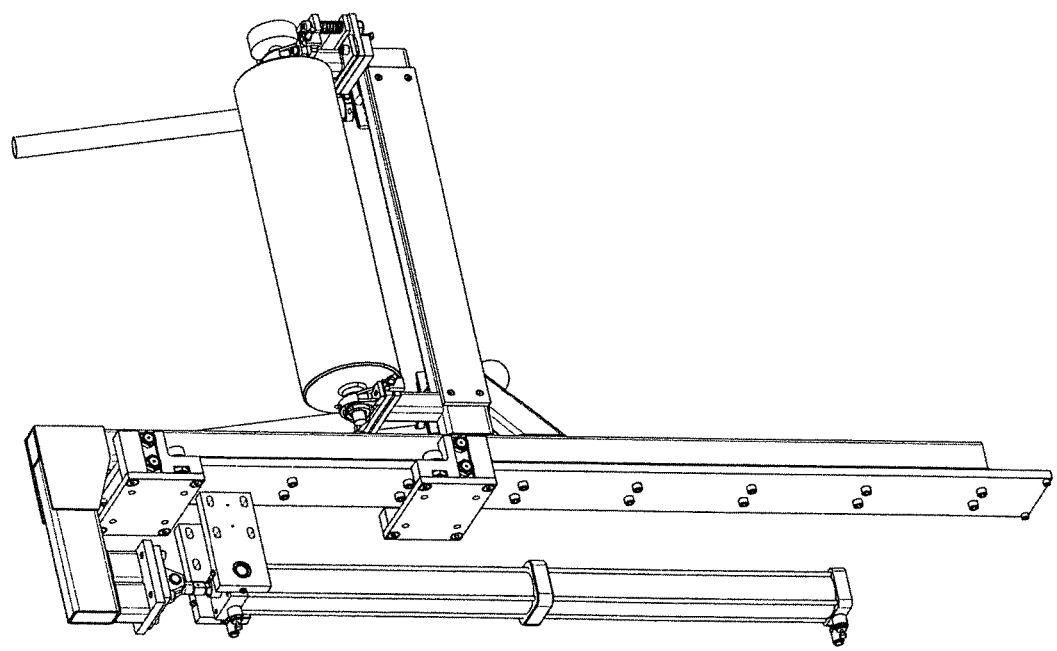
FIG. 11 is a front perspective view of a stripper roller assembly for use with a tire rubber extruder automatic loading and management system according to the preferred embodiment of the present invention.
Figure 12:
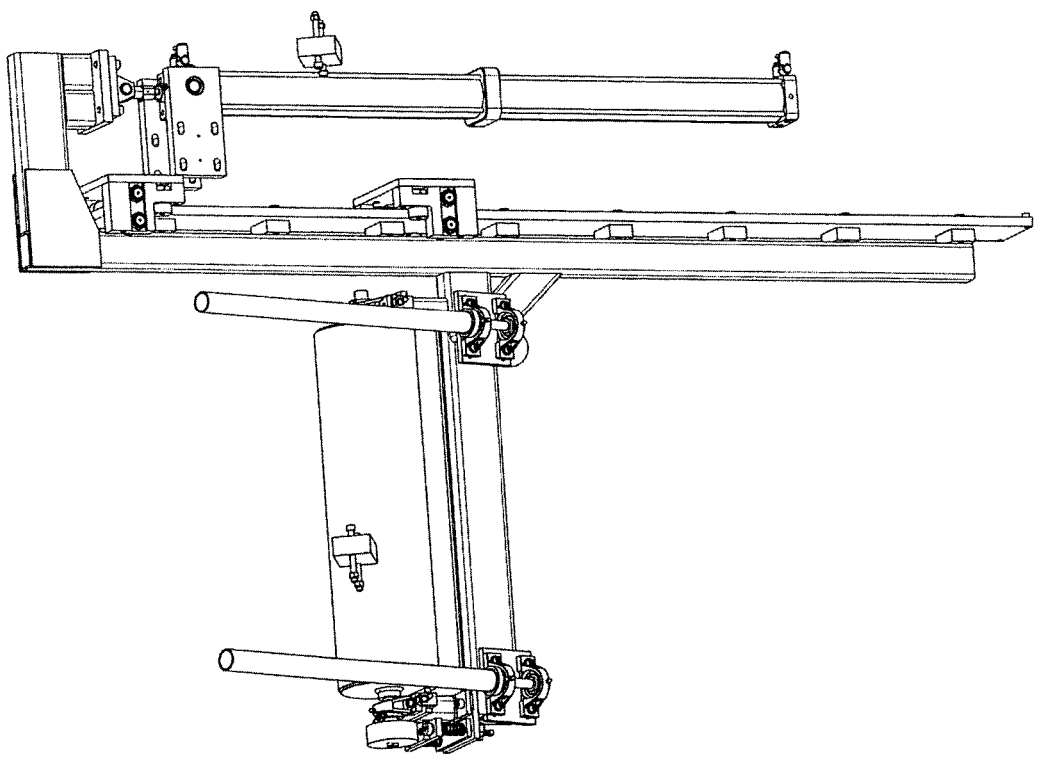
FIG. 12 is a rear perspective view of the stripper roller assembly of FIG. 11.
Figure 13:
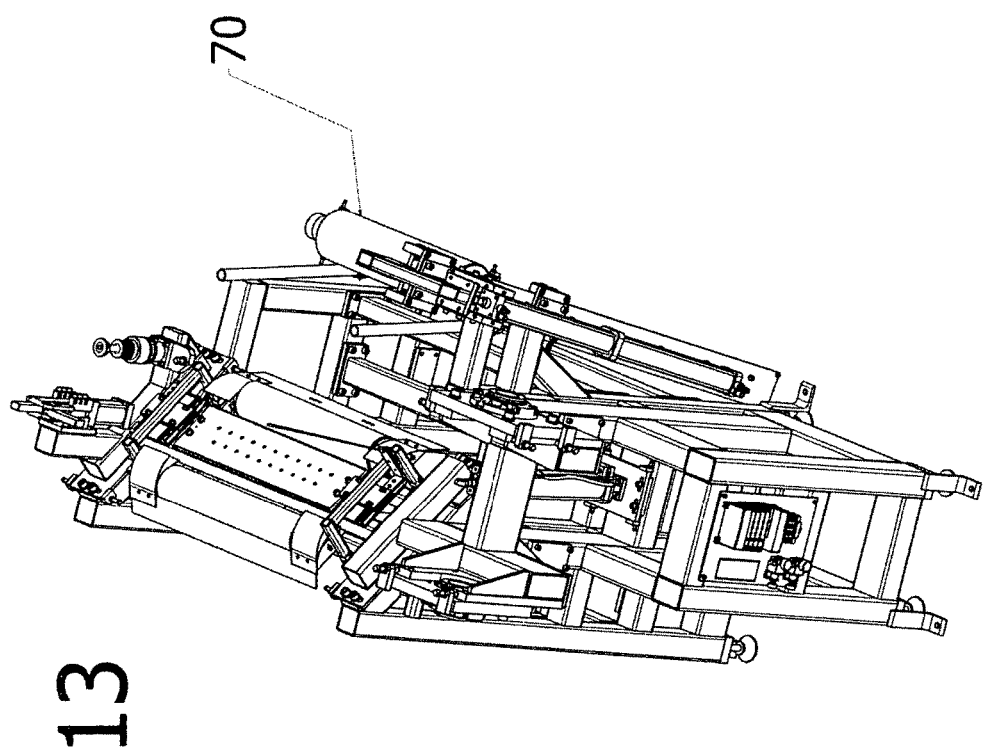
FIG. 13 is a side perspective view of a feed stitcher assembly for use with a tire rubber extruder automatic loading and management system according to the preferred embodiment of the present invention.
Figure 14:
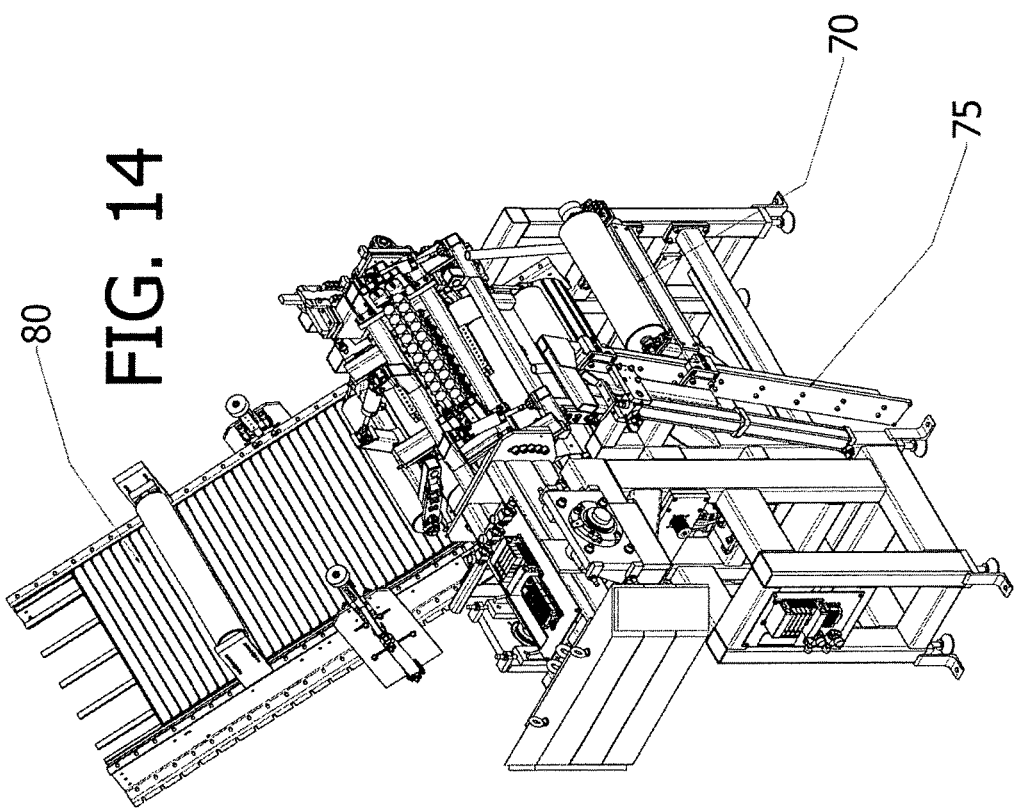
FIG. 14 is a front perspective view thereof.
Figure 15:
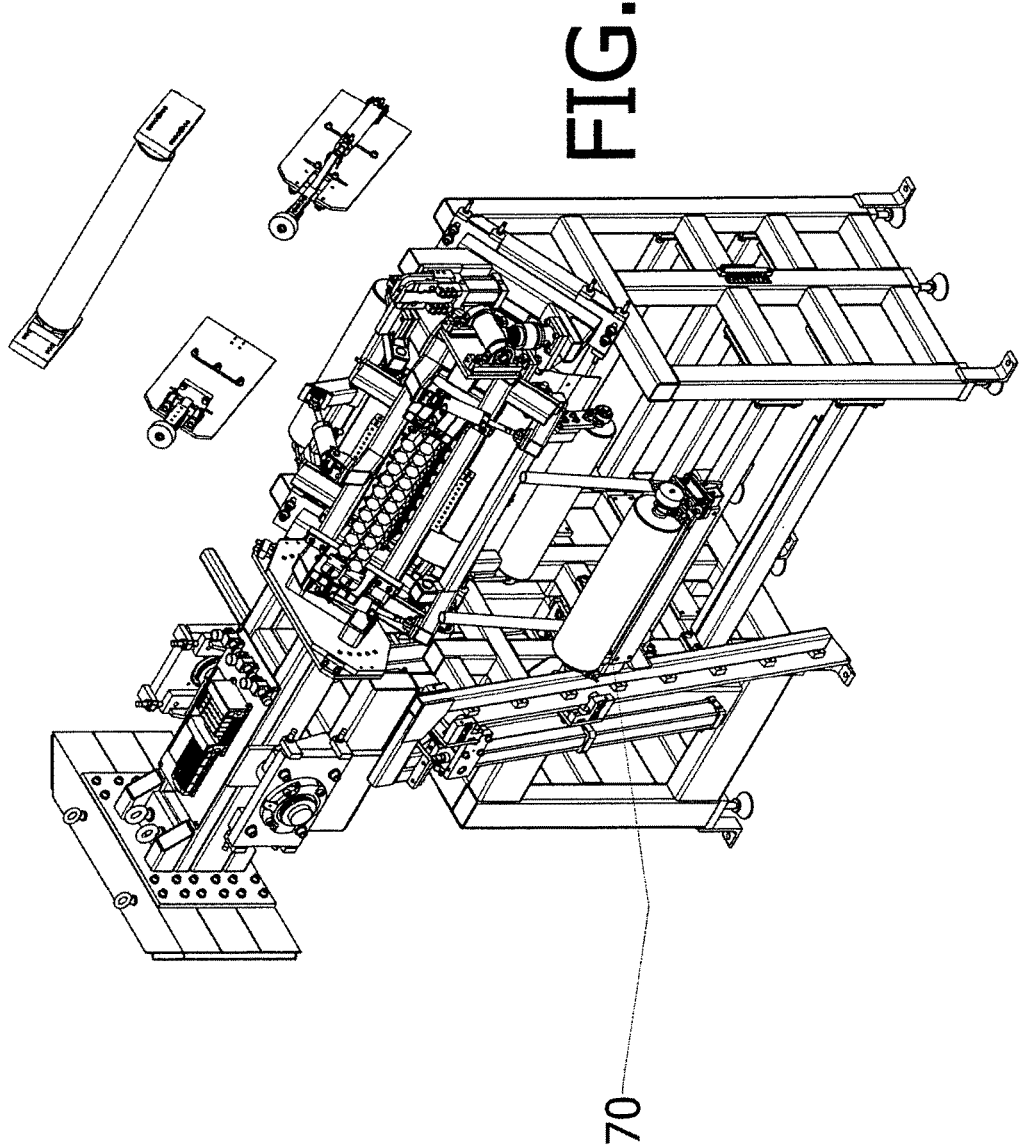
FIG. 15 is a partially exploded top front perspective view thereof.
Figure 16:
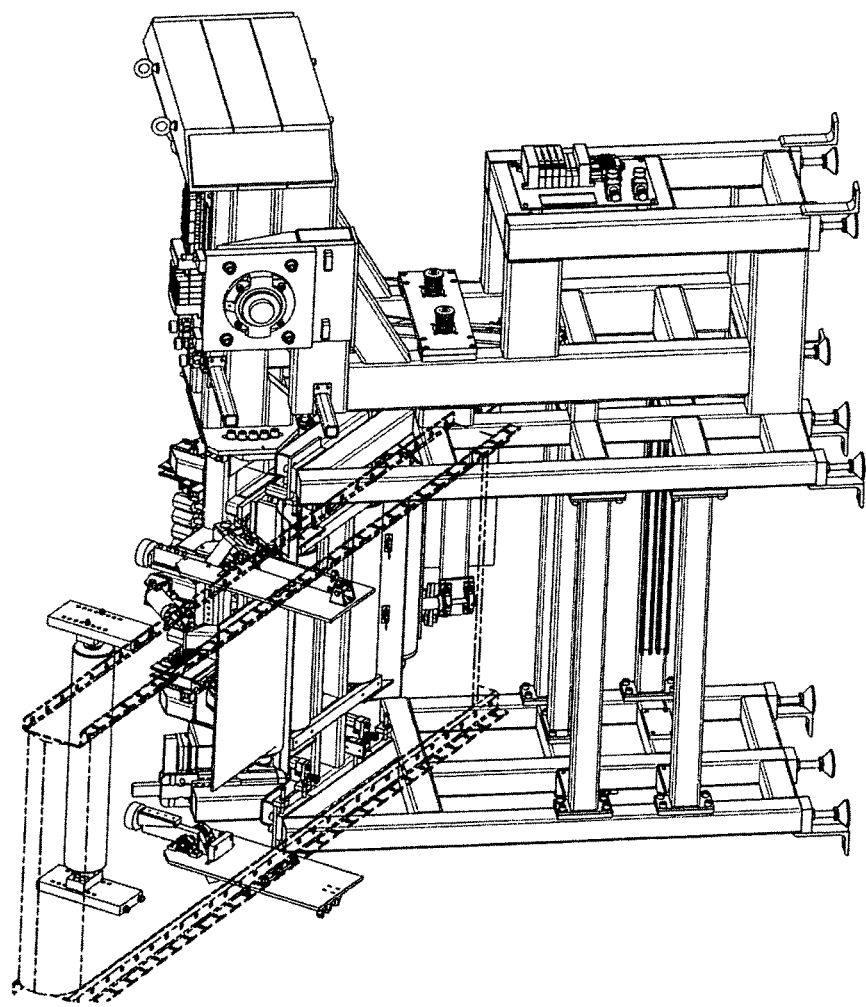
FIG. 16 is a rear perspective view thereof.
Figure 17:
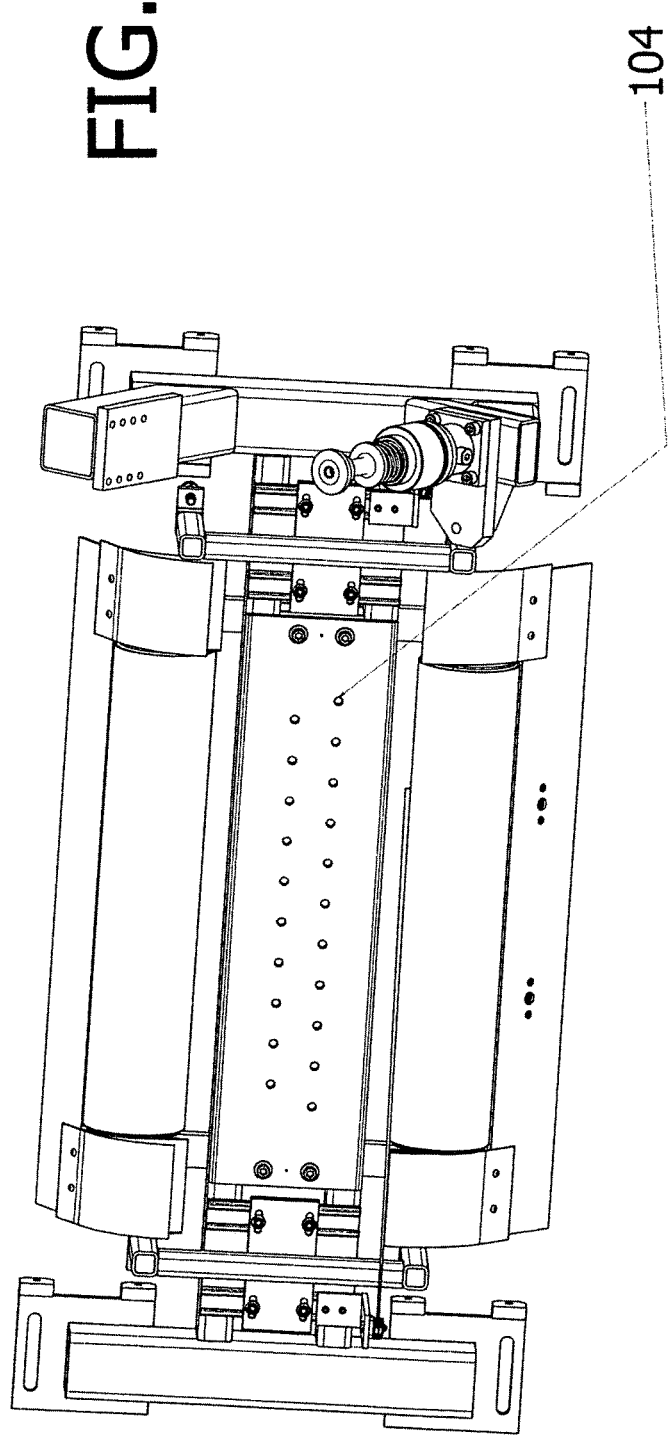
FIG. 17 is a top perspective view of a feed frame bottom roller assembly for use therewith.
Figure 18:
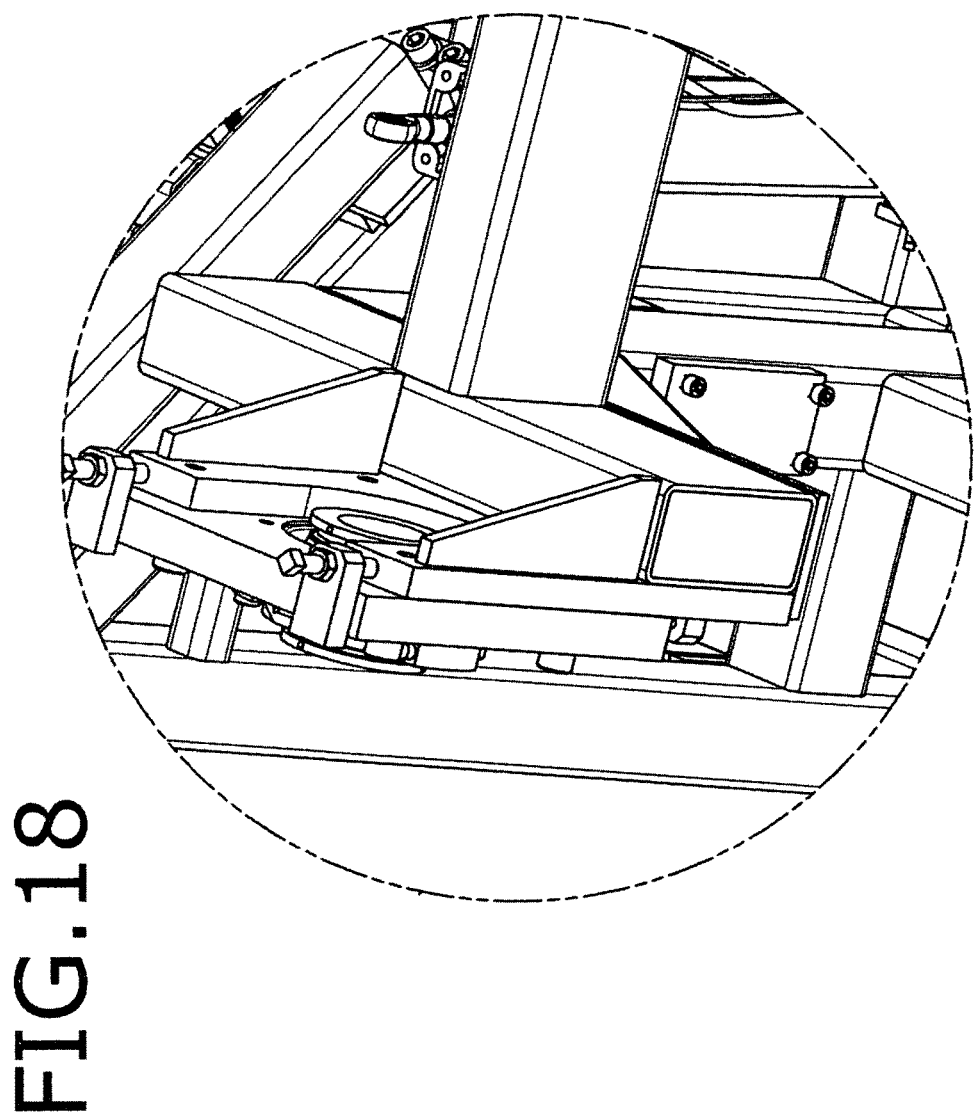
FIG. 18 is a partial detail perspective view taken along detail XVIII of FIG. 13.
Figure 19:
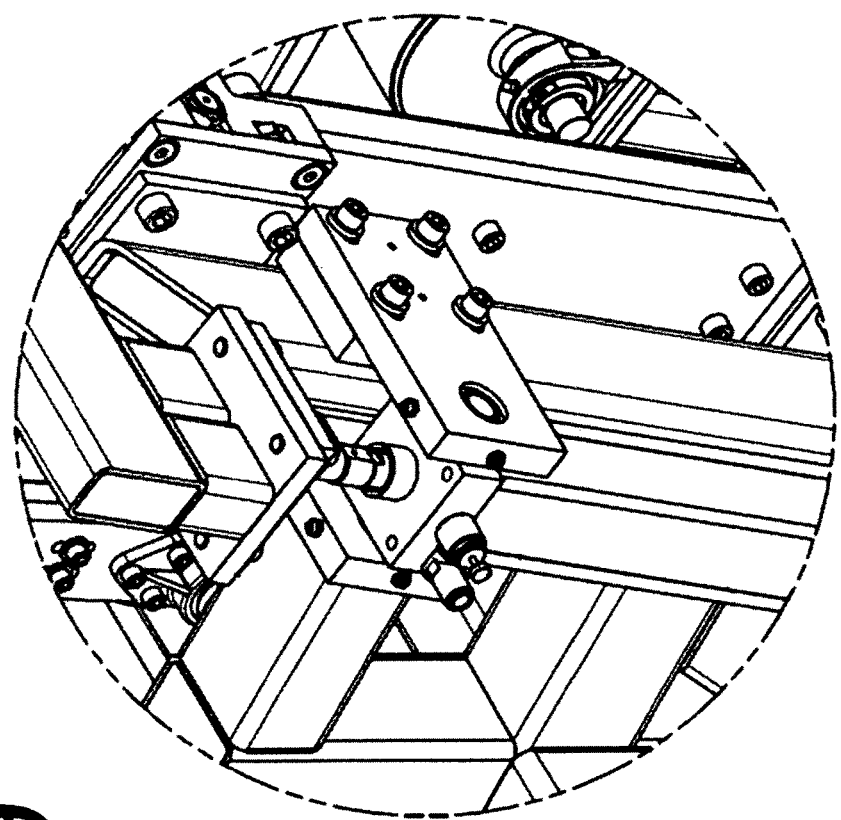
FIG. 19 is a partial detail perspective view taken along detail XIX of FIG. 14.
Figure 20:
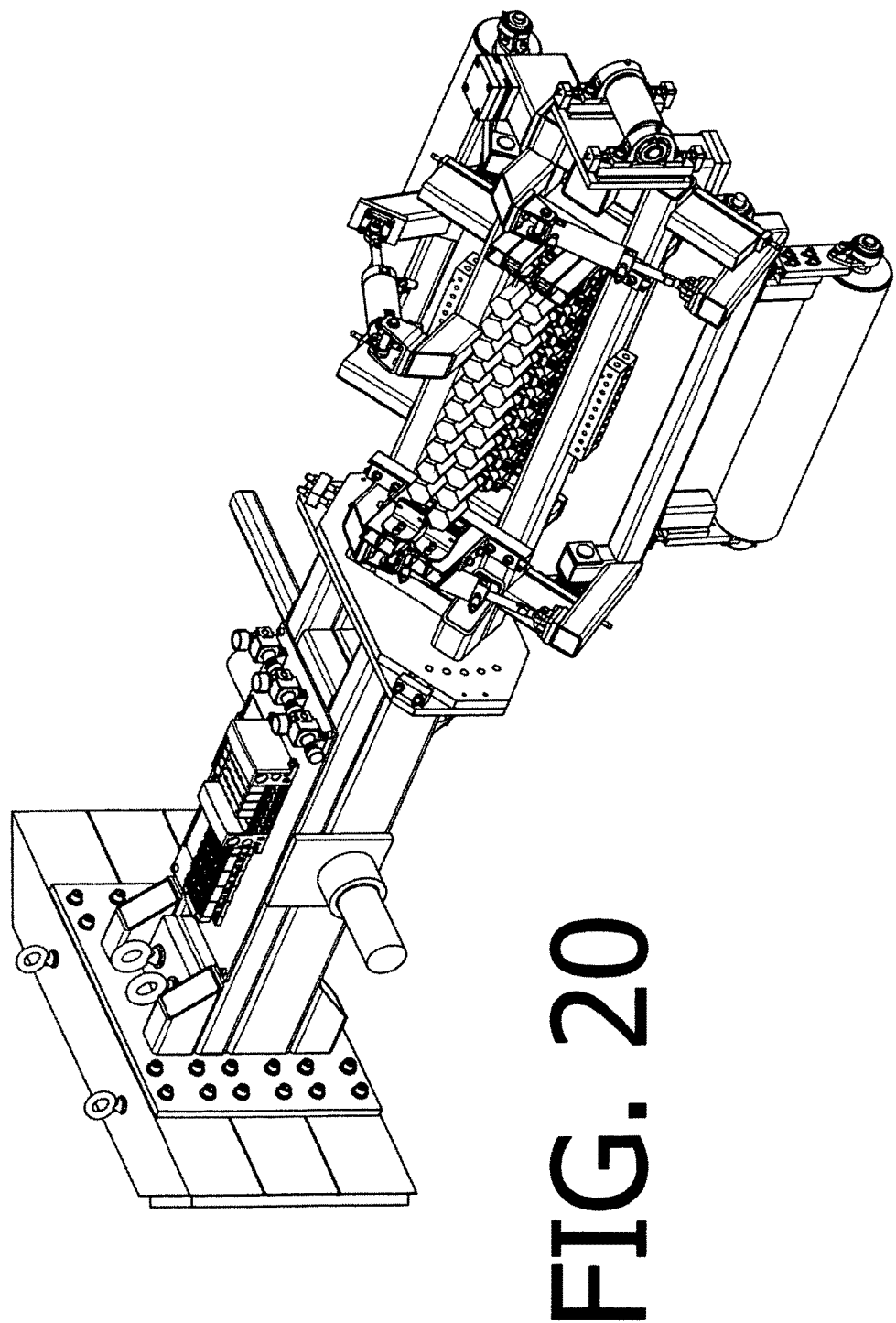
FIG. 20 is a front side perspective view of a pinch roller subassembly for use with a tire rubber extruder automatic loading and management system according to the preferred embodiment of the present invention.
Figure 21:
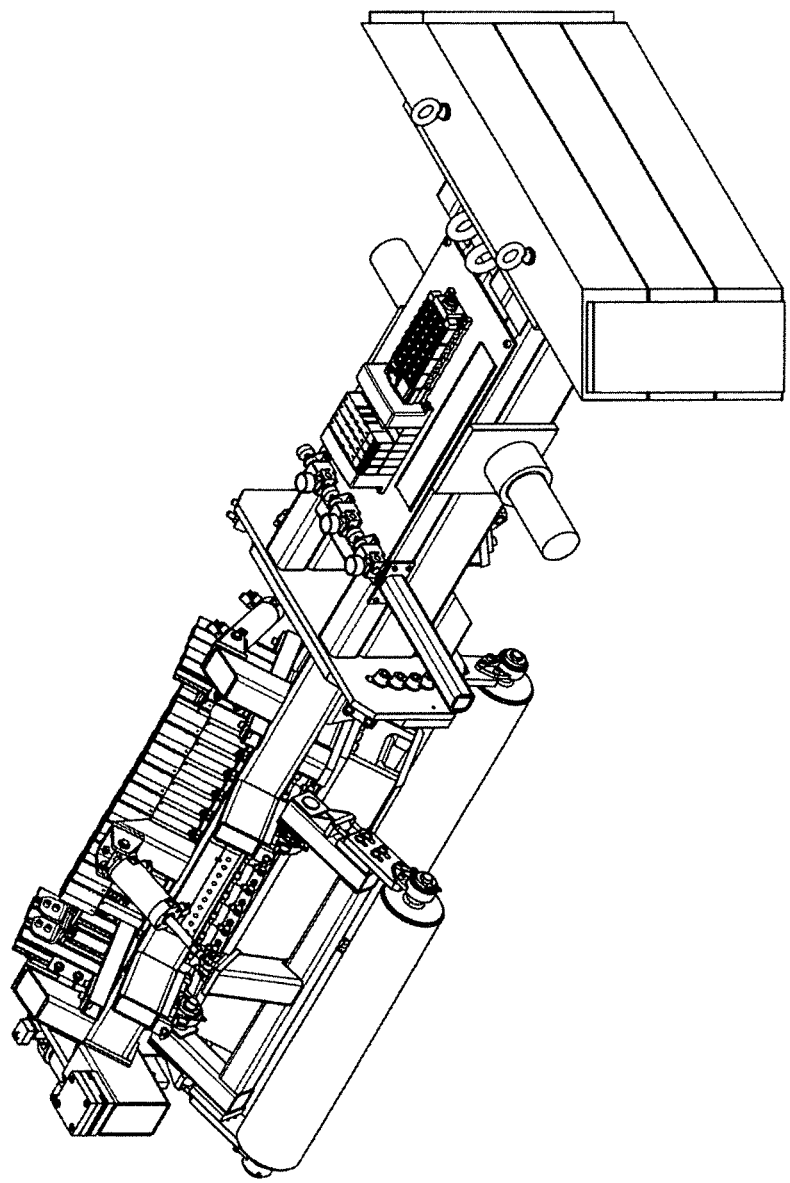
FIG. 21 is a rear side perspective view thereof.
Figure 22:
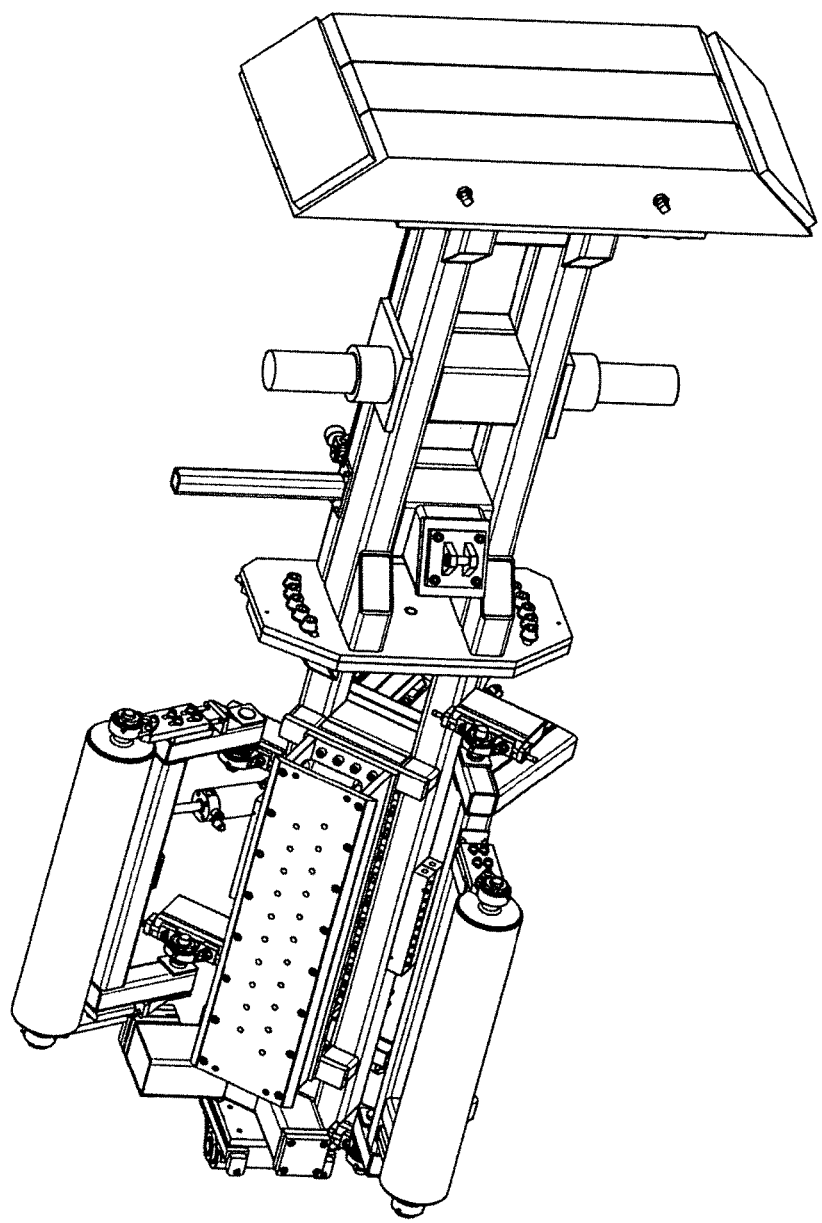
FIG. 22 is a bottom rear perspective view thereof.
Figure 23:
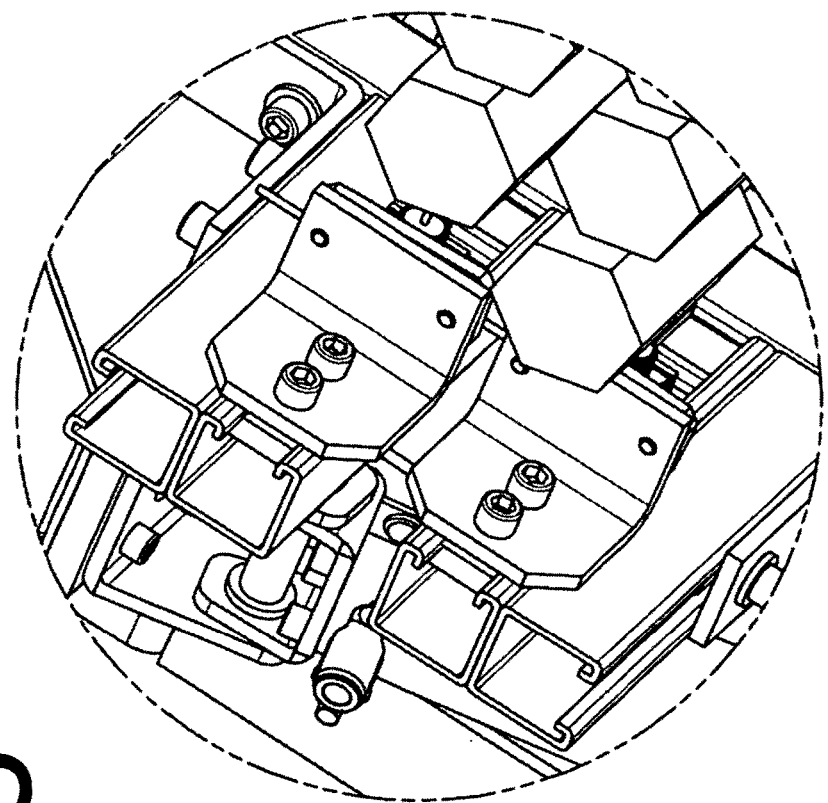
FIG. 23 is a partial detail perspective view taken along detail XXIII of FIG. 20.
Figure 24:
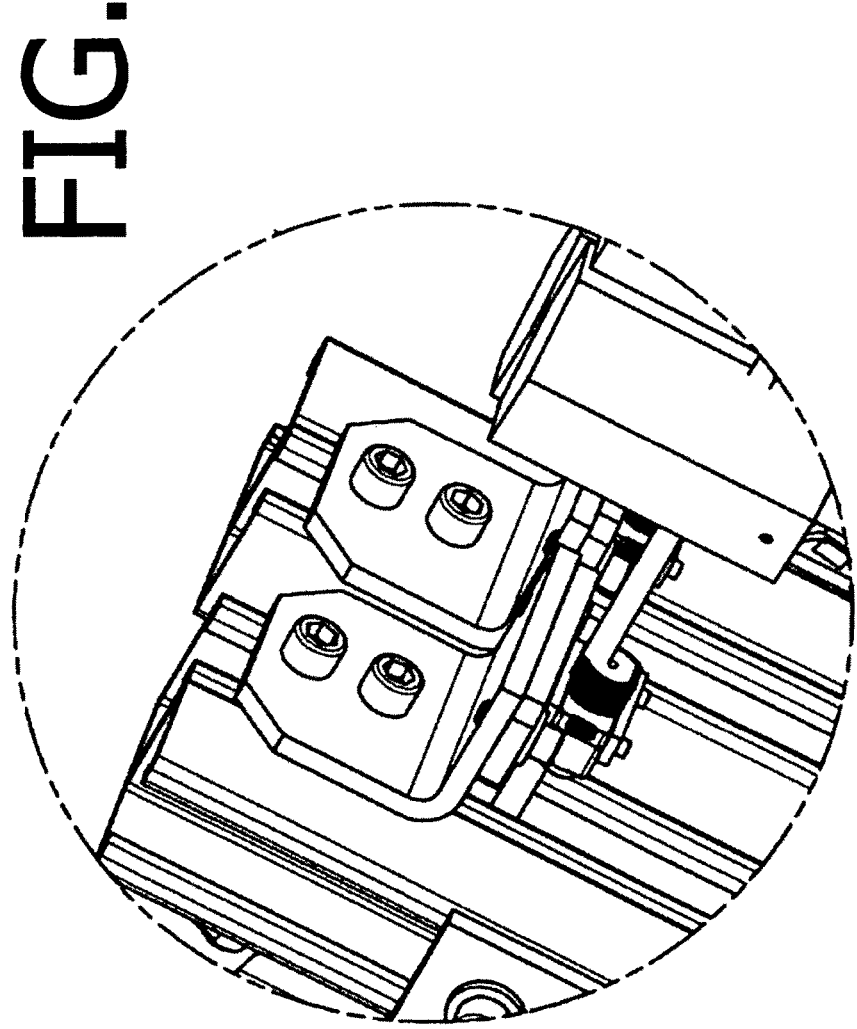
FIG. 24 is a partial detail perspective view taken along detail XXIV of FIG. 21.
Figure 25:
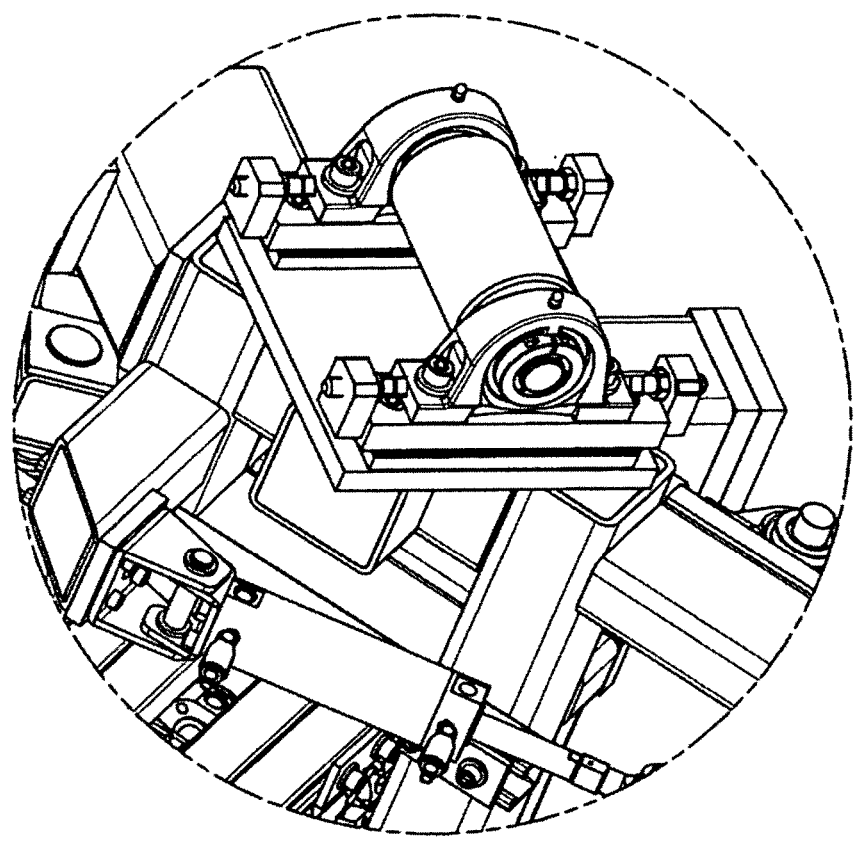
FIG. 25 is a partial detail perspective view taken along detail XXV of FIG. 20.
Figure 26:
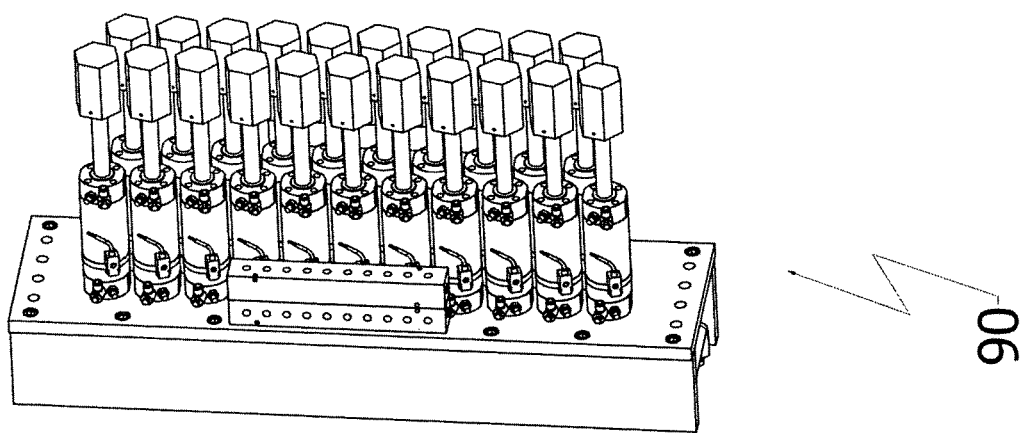
FIG. 26 is a side perspective view of a stitcher mount assembly for use with a tire rubber extruder automatic loading and management system according to the preferred embodiment of the present invention.
Figure 27:
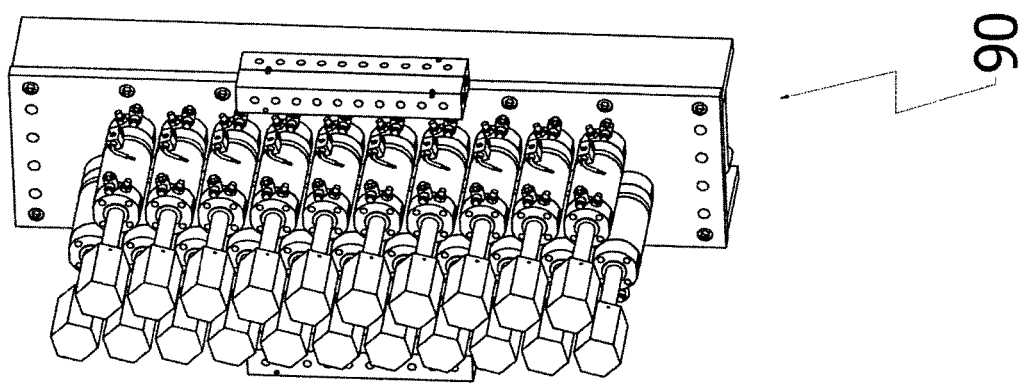
FIG. 27 is a top perspective view thereof.
Figure 28:
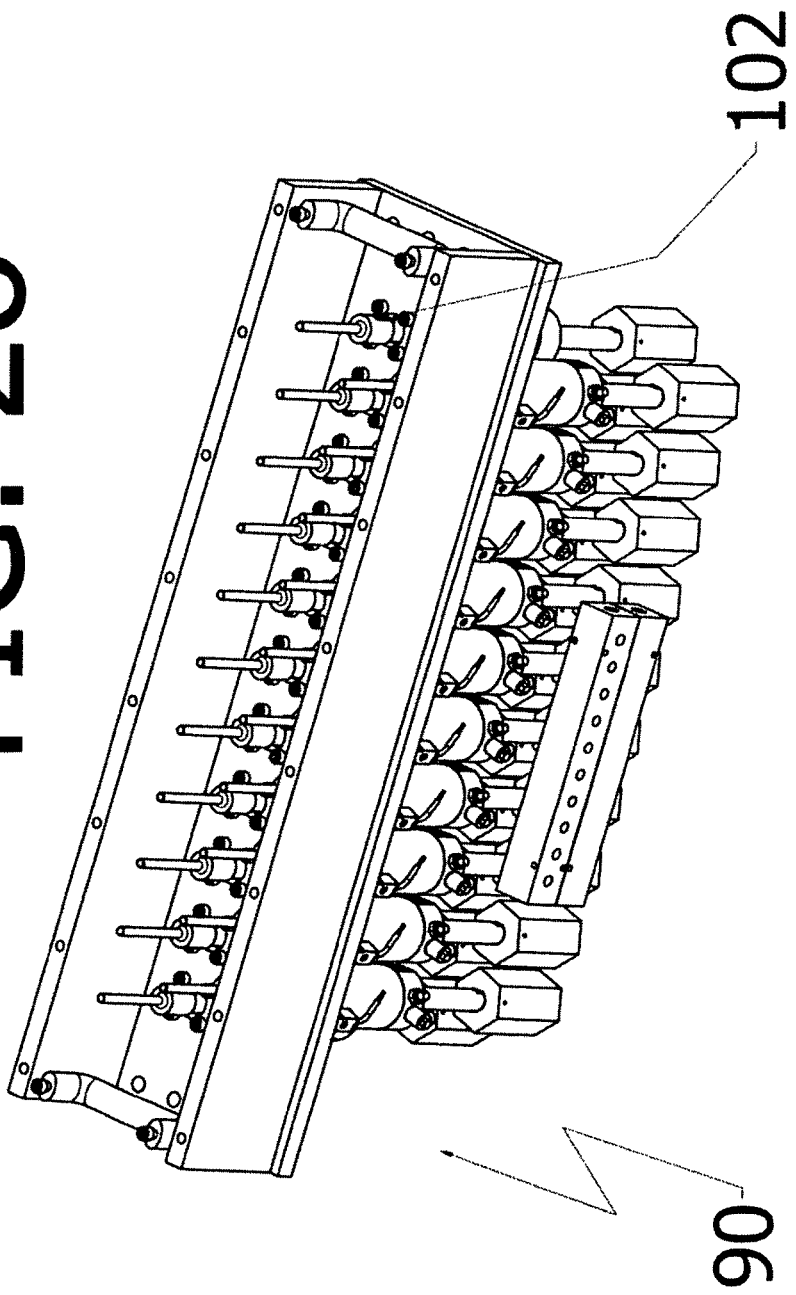
FIG. 28 is a rear perspective view thereof.

As better shown in conjunction with FIG. 3, rubber feedstock is received as entire pallets 43 of material. The material 44, while being planar and elongated when in use, is received as an irregular pile of material having nonuniform contours and shape resulting from the fanfold piling of rubber 44. While shown herein in an orderly and relatively geometrically regular volume, such is a limitation of the drafting process and in practice such is not the case. Rather, the feedstock 44 is ultimately provided with each pallet of material having a unique shape, with high spots and edges existing that have wide variations between material batches.

Once a leading edge target is identified as a convex element of the material pile apex 46, the conveyor 42 moves the material 44 from a load position from where it was received toward a slab prep station 60. The robot 50B is instructed by a control processor (not shown) to grasp the calculated and identified target 46.

Actuation of the grasping element 51a is executed to lift the grasped element 46 as being a working leading edge. The working leading edge 46 is thereby transferred to a prep station assembly 60. The preps station assembly 60 works the received material at its working leading edge in a variety of ways. The slab material 44 is released from its fan-fold configuration in a manner that can overcome any randomized cohesive attachment between the folds. Variations in rubber composition between individual batches of slab rubber, whether intended for tread or sidewall fabrication, as well as processing and environmental factors can all effect the workability of the material. As such it is a key feature of the present invention when applied in an Intended application within a tire manufacturing facility factory floor, to provide resilient enough capabilities to respond to such variations in an in situ manner so as to maintain the capability of continuous feedstock production of tire tread and/or sidewall extruders.

Referring now in conjunction with FIG. 4 through FIG. 10, the preparation station 60 is shown in greater detail for use within the system 30. Once a leading edge target 46 is identified as a convex element of the material pile apex 46, the robot 50 is instructed by a control processor (not shown) to grasp the calculated and identified target 46, lift the grasped element 46 as being a working leading edge, and transporting the working leading edge to prep station assembly 60. The preps station assembly works the received material at its working leading edge in a variety of ways. A pair of stripper feed roller assemblies 66 feed and guide the grasped element, with rollers 68 that move the material back and forth to released the material from any fan-fold configuration in a manner that will overcome any randomized cohesive attachment forces that may exist between the material folds. The working leading edge is then presented to a cutting table assembly 73 in which a second scanner device 74 can identify the shape and contour of the working leading edge to allow for cutting of a leading edge. The working leading edge of the feed material is scanned within the prep station assembly 60 such that irregular boundaries are identified and a cut line is identified that eliminates such irregular material. Further, since "clumping" of rubber material may result from the grasping of the claw 51a on the end effector 51, this bound material is further identified for removal in the cut scrap that is formed by the cutting table cutter 75.

A newly created leading edge formed by the cutter 75 is then secured by the edge grippers 51b so that the newly identified leading edge of the rubber material slab can then be transported by the robot of the slab load system 50 to a feed stitcher assembly, generally noted as 70.

The feed stitch assembly 70 is shown in greater detail in conjunction with FIG. 13 through FIG. 19. A prior batch of rubber slab material is positioned on the feed stitcher assembly 70 such as to allow a subsequent batch of rubber slab to be positioned linearly adjacent thereto for subsequent attachment together. An exit feed conveyor 80 dispenses the integrated, connected batch slab elements as a continuously fed material stream to the remainder of the tire manufacturing process. A loop of rubber sab matrial is accumulated between the top of the inclined conveyor and the extruder. The conveyor 80 accommodates movement of material back and forth in conjunction with the stripper roller subassembly 75 in a manner that can accumulate enough material within the process dwell time such as to allow for the feed stitcher assembly 70 to provide a joining function between the trailing edge of a previous slab batch and the leading edge of a following slab batch. This joining function is provided by a stitcher assembly 90.

Referring now to FIG. 20 through FIG. 28, the stitcher assembly 90 is shown in greater detail. By mechanically affixing adjacent linear rubber slabs 44 together in an automated fashion, the continuous process nature of the extruder device itself can be utilized. The present tire rubber extruder automatic loading and management system 30 provides the continuous processing transition between the batch nature of the mixing processes that occur upstream and the continuous nature of the material feed for the extruder. This is currently done by mechanically joining the trailing edge of a prior slab to the leading edge of a subsequent slab in through automated stitching of material to form a transition between the batch and continuous processes.

Figure 29:
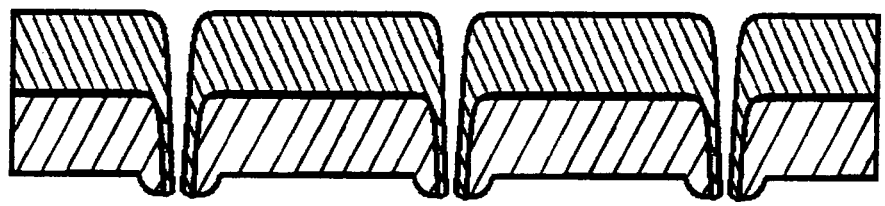
FIG. 29 is a cross sectional schematic of a stitched connection according to the preferred embodiment of the present invention.

Referring now in conjunction with FIG. 29, the details of the mechanical joint, generally noted as 100, is shown. The creation of a mechanical stitching together of adjacent rubber slabs forms a quantifiable improvement over the existing art and is accomplished by driving a series of stitch pins 102 through overlapped segments of rubber slab forming the transition zone between batches. Each stitch pin 102 is formed as a blunt pin that plunges through overlapped layers of material. The stitch pins 102 are driven by actuators supported in a laterally aligned array affixed to a stitcher mount assembly 90. As the pins 102 plunges through both rubber slab layers to a specific depth into a clearance hole 104 (shown herein as part of the feed frame bottom roller assembly 170 of FIG. 17), an optimized rubber mechanical adhesion zone is created with minimal sticking of the pins and reasonable force required by the stitcher. The result is a funnel shaped adhesion channel 110 where the top layer of the material penetrates entirely through the bottom layer of the material in a direction perpendicular to the direction of movement of the slab. The resulting "rivet" like button structures are extremely strong, and have superior performance when compared with conventionally available mechanical cohesive mechanism or adhesive systems. This new stitched connection overcomes weaknesses of other systems in their effectiveness, strength and consistency.

2. Operation of the Preferred Embodiment

The operation of the present invention is best described in conjunction with its relationship to vehicle tire tread and sidewall extrusion operations where tire components such as tread, sidewall, and apex are prepared by forcing uncured rubber compound through an extruder to shape the tire tread or sidewall profiles. Extrusion is one of the most important operations in the tire manufacturing process because it processes most of the rubber compounds produced from the mixing operation and then prepares various components for the ultimate tire building operation.

The extruder in a tire manufacturing process is a screw-type system, consisting primarily of an extruder barrel and extruder head. Though there are many variations that can exist within the extrusion process, the given examples are quite general, and are not limited to the specific examples given. On a continuous extrusion line feedstock material is prepared and conveyed to an extruder machine, with the screw of the extruder machine propelling the feedstock through the machine, compressing it and forcing it out through a die.

The present invention may be utilized as an extruder automated slab loading system. It also may function as a pallet management system for coordination of the flow of empty pallets back onto the factory floor. Such a system has been found to improve productivity by having a 98.5% or better reliability. Such continuity frees up plant operators to work elsewhere on the line. Another key feature is the creation of continuous rubber feeding to the extruders via auto-stitching attachment of sequential batch slabs. Such as system has been further found to improve quality by providing a constant rubber volumetric feed rate. The use and flexibility of such an automated robotic solution also provides improved ergonomics by eliminating manual feeding of heavy rubber slabs as is currently the state of the art in the Industry. Further, the present invention increases productivity due to the continuous throughput of rubber to the extruder.

An automated slab loader, for either the loading of tread or sidewall slabs, may consist of at least a three station chain pallet conveyor accessible by a Fanuc M-900iA/350series Robot having a Smart-Pick end effector. Sidewall rubber is contained on half pallets, while tread rubber is of a full width of a pallet. Automated rubber slab picking, measurement, and dressing is performed for the automated stitching for the creation of a continuous rubber supply for subsequent extrusion operations.

To use such a device, the following sequence of operations may be deployed. A fork lifter driver initiates a "Request to Enter" at a load station, where a full or partial pallet is loaded into a loading station. The robot, having an integrated vision sensor, then finds the highest point on the rubber slab stack while the conveyor is positioning the stack to present to the preparation assembly station. The robot navigates the lost motion (level compliant) single layer picker head to the highest point on the rubber slab. The single layer picker head will mechanically lock onto the rubber slab with holding sufficient force to remove the rubber slab. The robot drapes the rubber slab onto a measurement station and over the drive roller where the measurement station's mating second roller will lower on top of the rubber slab. An additional camera and laser device is used to find the leading edge of the slab on the pallet, but this devices is also used to look at the plates of the prep top rollers to detect slab thickness. Laser sensors are mounted on plates above the rollers to detect the side edges of the rubber slab to allow the robot to center the slab in the prep station and to find the leading edge after it is cut for the gripper to grip. Driven as "pinch" rollers, any major lumps or bound layers are detected. The robot then engages a cutting mechanism to cut off any identified non-straight edge or any "lumps" that may be found. Any cuttings will fall into a collection cart for recycling.

The robot then grips the pre-located single layer square edge of the rubber slab that has been prepared as the new leading edge of the material slab. The measurement pinch roller then retract so the robot can guide the edge of the rubber slab in synchronization with the conveyor as the pallet indexes half the pallet width into the stitching/feeding station for sidewall slab operations. Since sidewall slabs are half as wide as tread slabs, they may be transported as two slabs per pallet. It should therefore be apparent to a person having ordinary skill in the relevant art, in light of the present teachings, that variations may be made to accommodate indexing of pallets and indexing of individual materials positioned on common pallets while still being within the range of equivalents being taught by the present invention.

If the trailing end of a previous fed section of rubber slab is present, the robot slightly overlaps the two layers of rubber while the auto stitcher joins the two sections of rubber. If the rubber is being fed for the first time, then the robot places the rubber slab under a modified pivoting hold-down ski to start feeding the rubber, and an operator may manually feed the rubber from the top of the inclined conveyor into the extruder. While the rubber is feeding, the robot returns to the second half of rubber and repeat the measurement, edge dressing, and gripping the edge of the rubber in preparation for stitching together adjacent pieces.

The conveyor and robot index the pallets as material is dispense and stitched together. A fork lift operator can now load another full pallet of material to keep the process going. Once the in process is completely offloaded, empty pallet are indexed into an unload station and the auto feeding process continues.

As described in greater detail above, the robot is mounted suspended upside down on a self-supporting steel frame. Such a form factor reduces the overall machine footprint, and allows the robot to be capable of reaching completely to the bottom of each pallet, as well as to be able to prepare the "on deck" rubber to be joined while "in process" rubber is being fed to the extruder. Such a timed sequence reduces overall cycle time.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Claims appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. In a rubber extruder feed stock for use in the loading and placing or rubber slabs for the continuous feeding of segmented lengths of rubber extruder feed stock for the manufacture of tires, the improvement comprising:
    a rubber mechanical joint for structurally affixing adjacent and partially overlapping linear rubber slab elements together to form a physical communication between said rubber slab elements without adversely affecting chemistry of the rubber slab elements, said rubber mechanical joint formed by driving a least one stitch pin through overlapped segments of rubber slab and subsequently withdrawing said stitch pin completely and thereby forming the transition zone between batches;
    wherein said stitch pin being driven into and withdrawn from said overlapped segments of rubber thereby each form a blunt rubber attachment pin from said overlapped layers of material and each blunt rubber attachment pin forms a funnel shaped adhesion channel where a top layer of the material penetrates entirely through a bottom layer of the material in a direction perpendicular to the direction of movement of the slab.

2. The improvement of claim 1, wherein said mechanical joint is formed by a series of blunt rubber attachment pins formed from said rubber slab elements themselves through overlapped segments of rubber slab and adapted for mechanically attaching adjacent rubber slab elements during extrusion and thereby forming a transition zone between adjacent batches of rubber slab material.

3. The improvement of claim 2, wherein each said stitch pin is formed as a blunt pin that plunges through overlapped layers of material.

4. The improvement of claim 3, wherein a result of said stitch pin plunging through overlapping layers of material comprises the creation of a blunt rubber attachment pin having a funnel shaped adhesion channel whereby a top layer of the material penetrates entirely through a bottom layer and forms a button structure protruding from said bottom layer.

5. A joint for connection of adjacent rubber slabs being continuous fad as a rubber extruder feed stack for the manufacture of tires, the joint comprising:
- an upper layer formed of a portion of a first rubber slab element having a bottom surface;
- a lower layer formed of a portion of a second rubber slab element having a top surface;
- at least one funnel shaped adhesion channel formed through overlapping rubber slab elements where said bottom surface is adjacent to said top surface and said funnel shaped adhesion channel includes a cone shaped channel sidewall generally perpendicular to said bottom surface and said top surface and in which an extension of said upper layer is extruded past said bottom surface and through said lower layer.

6. The joint of claim 5, further comprising a plurality of said funnel shaped adhesion channels.

7. The joint of claim 6, wherein said plurality of said funnel shaped adhesion channels are formed in a spaced apart arrangement about the joint.

8. The joint of claim 7, wherein said spaced apart arrangement forms a geometric array.

\* \* \* \* \*